United States Patent [19]

Thomas

[11] 4,186,048
[45] Jan. 29, 1980

[54] NEUTRON FLUX MONITORING SYSTEM
[75] Inventor: Harold A. Thomas, San Diego, Calif.
[73] Assignee: General Atomic Company, San Diego, Calif.
[21] Appl. No.: 792,507
[22] Filed: May 2, 1977

Related U.S. Application Data

[63] Continuation-in-part of Ser. No. 720,747, Sep. 7, 1976, abandoned.

[51] Int. Cl.[2] .............................................. G21C 17/00
[52] U.S. Cl. ............................. 176/19 J; 176/19 EC
[58] Field of Search ............... 176/19 R, 19 EC, 19 J, 176/20 R, 24

[56] References Cited

U.S. PATENT DOCUMENTS

| | | | |
|---|---|---|---|
| 3,136,698 | 6/1964 | Mann | 176/24 |
| 3,423,285 | 1/1969 | Curry et al. | 176/24 |
| 3,652,898 | 3/1972 | Steeves | 176/19 EC |
| 3,689,802 | 9/1972 | Waldmann | 176/19 EC |
| 3,780,292 | 12/1973 | Klar | 176/19 R |
| 3,810,138 | 5/1974 | Thompson et al. | 176/19 EC |
| 3,888,772 | 6/1975 | Neuner | 176/19 J |
| 3,894,912 | 7/1975 | Cohn | 176/19 EC |
| 3,942,014 | 3/1976 | McDowell et al. | 176/19 EC |
| 3,979,256 | 9/1976 | Keefe | 176/19 J |
| 4,054,486 | 10/1977 | Lefebvre et al. | 176/19 EC |

OTHER PUBLICATIONS

Guidebook of Electronic Circuits, John Markus, (1974), McGraw Hill Book Co., p. 95.

Primary Examiner—Samuel W. Engle
Assistant Examiner—S. A. Cangialosi
Attorney, Agent, or Firm—Fitch, Even & Tabin

[57] ABSTRACT

A neutron flux monitoring system is described for a nuclear reactor which enables the monitoring of very low levels of neutron flux such as may exist during the shutdown condition of the reactor. The pulses produced in the flux detectors distributed around the reactor core and ordinarily used for power range monitoring are conveyed, by isolation means, to summing means which provide a count rate output corresponding to the total number of pulses produced by all of the neutron flux detectors.

9 Claims, 3 Drawing Figures

NEUTRON FLUX MONITORING SYSTEM

This application is a continuation-in-part of application Ser. No. 720,747 filed Sept. 7, 1976, now abandoned.

This invention relates generally to nuclear reactors and, more particularly, to an improved neutron flux monitoring system for use with a nuclear reactor.

Normal operation of a nuclear reactor, particularly a power reactor, may be divided broadly into three ranges; source or start-up range, intermediate range and power range. In order to indicate the power level in the reactor at all times to permit safe control, the neutron flux in the reactor is monitored. The neutron flux at any point in the reactor is proportional to the fission rate and hence also to the power level. Because of the extreme temperatures and radiation levels in the core, the neutron sensors used for start-up and safety operation are usually placed outside the core.

Typical neutron flux measurements in the intermediate range and in the power range are achieved utilizing fission chambers. These fission chambers, which are well known in the art, for practical reasons are placed at specific locations outside but adjacent to the reactor core. It is customary to have an array of detectors both vertical and around the core so that a relatively accurate picture of the flux distribution in the reactor core may be obtained during start-up and power operation of the reactor. The array of fission chambers are also required to provide (usually four) independent and redundant flux measurements for reactor safety purposes. As is known to those skilled in the art, the output of the electronic circuits used with the fission chambers may be logarithmic (used during the rise to power) or linear (used at or near the full power level). Count rate circuits are typically utilized in the low ranges of flux whereas Campbelling type circuitry or d.c. current techniques may be required for the higher flux ranges, where pulse resolution becomes a problem.

In the shutdown condition of the reactor, the source level neutron flux is typically at an extremely low level, and because the detectors used for flux monitoring in the higher ranges have such low sensitivity, a separate low level monitoring system has typically been required. In the past, prior art systems in this lower flux range of reactor operation have employed high sensitivity proportional counters feeding locally mounted preamplifiers which deliver signals through coaxial cables to count rate circuits mounted in the control room. Such proportional counters have exhibited significant disadvantages as a result of short operating life and being highly susceptible to gamma background radiation. Moreover, because separate placements, preamplifiers and wiring are required for such a separate system, a significant added cost results.

It is an object of the present invention to provide a means for combining the pulse signals from the array of independent fission chamber assemblies placed around the core for power range monitoring and safety purposes to achieve a high system sensitivity to neutrons in the source range and in the shutdown condition without violating their independence.

It is a further object of the invention to provide an inexpensive, reliable neutron flux monitoring system capable of measuring the full range of neutron flux in a nuclear reactor, including very low levels of neutron flux.

These and other objects of the invention will become apparent to those skilled in the art from the following description, taken in connection with the accompanying drawings, wherein.

Figure 1:
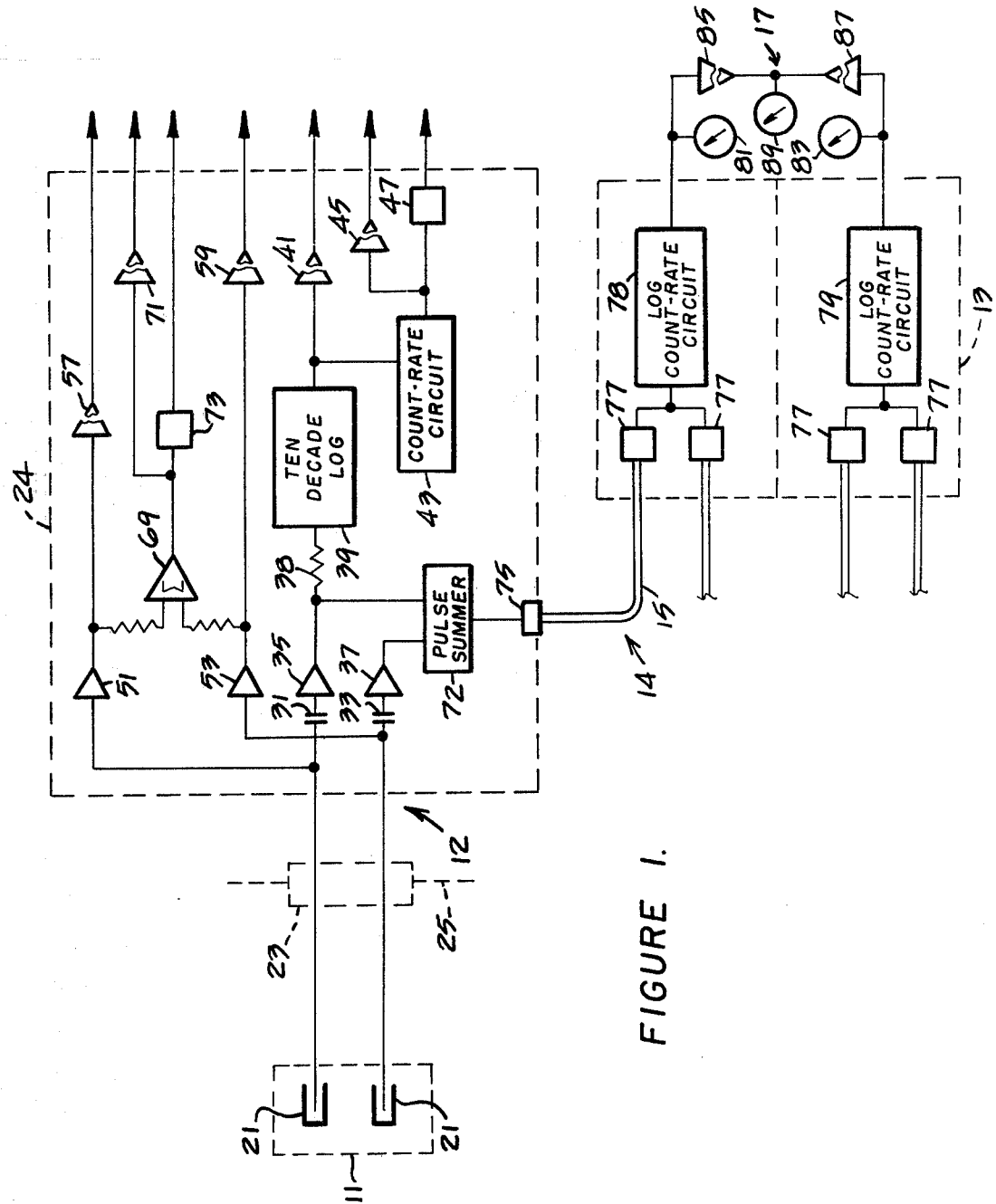
FIG. 1 is a schematic block diagram of a neutron flux monitoring system constructed in accordance with the invention.

Very generally, the system of the invention is employed in a nuclear reactor wherein a plurality of neutron flux detector assemblies 11 provide on respective output channels 12, pulsed output signals at pulse rates corresponding to detected neutron flux. Signal processing means 24 provide for each channel an indication of neutron flux in the intermediate and power ranges of the reactor. The system of the invention includes summing means 13 responsive to pulsed input signals to provide a pulsed output signal corresponding to the sum of the input pulses thereof. A plurality of coupling means 14 each connect a respective one of the output channels to the summing means for providing a pulsed signal thereto substantially corresponding to the pulsed output signals provided by the corresponding detector assembly. The coupling means each include isolation means 15 for preventing spurious communication between the summing means and the cables. Indicating means 17 are connected to the output of the summing means to represent the pulse rate of the output pulses of the summing means.

Referring now more particularly to FIG. 1, the invention is shown in a preferred embodiment for use in a power reactor wherein approximately eleven decades of neutron flux measurement are required for monitoring neutron flux over the full range of the reactor. The monitoring system employs a plurality of detector assemblies, each of which utilizes one or more fission chambers 21, two being shown in FIG. 1. Only one detector assembly is shown in the drawing but a typical reactor may employ four of these detector assemblies located at four different positions around the reactor core. Typically, two or three fission chambers are used per assembly for the purpose of monitoring vertical flux tilts and the four separate assemblies are used in a two out of four logic redundant system for safety purposes. The typical length of the detector assembly is approximately $3\frac{1}{2}$ meters. In the drawings, the power supplies for the fission chambers are not illustrated for the purpose of simplification. The range of flux typically covered by a complete neutron flux monitoring system extends from about 0.1 nv to greater than $10^{10}$ nv (approximately $11\frac{1}{2}$ decades). A single fission chamber will cover the range of about 1 nv to $2 \times 10^{10}$ nv. The system sensitivity when pulses from all twelve detectors are summed will extend below 0.1 nv.

The output of each of the detector assemblies 11 is applied to an output channel 12. In the illustrated embodiment, each channel comprises the two output lines from the fission chambers 21 and a safety drawer 24. A separate safety drawer 24 is provided for each detector assembly 11. The outputs of the fission chambers are fed to the safety drawer through a suitable junction box (not shown) containing line and decoupling filters (not shown) for the chamber high voltage (not shown). The secondary containment is indicated schematically by the line 25 and 23 represents the penetration for chamber leads.

In the illustrated embodiment, the safety drawer 24 contains capacitors 31 and 33 through which the a-c component of each of the signals from the outputs of the fission chambers 21 are applied to pulse amplifiers 35 and 37. The output of the amplifier 35 is applied through a resistor 38 to a ten decade log circuit 39 (such as shown in U.S. Pat. No. 3,579,127) in the safety drawer 24. The circuit 39 is suitably constructed to provide a log output signal of flux for the upper ten decades of the flux range of the reactor. The circuit 39 provides its output signal through a buffer amplifier 41 to provide an indication of the log of the output of the fission chamber 21 in the detector assembly. To provide a rate output, the output of the ten decade log circuitry 39 is also applied to a rate circuitry 43, the output of which is applied to an indicator, not shown, through a suitable buffer amplifier 45. In the event the rate of change of flux exceeds a preset value, a bistable trip 47 is coupled to the output of the rate circuit 43 to produce a rate trip signal.

The d.c. components of the outputs of the fission chambers 21 from each detector assembly 11 are also applied to d.c. amplifiers 51 and 53 in the safety drawer 24. These signals are proportional to flux level in the upper decades and are amplified by buffer amplifiers 57 and 59 to indicate the level of the particular fission chamber, thus providing an indication of flux tilts. In addition, the outputs of the amplifiers 51 and 53 are summed in a summing amplifier 69 and are applied through a buffer amplifier 71 to indicate the power sum or average power in that particular detector assembly. The power sum signal is also applied to a bistable trip 73 which is set to produce a power level trip signal for use in the reactor safety logic system.

The foregoing described circuitry within the safety drawer provides, for each detector assembly, a suitable indication of the neutron flux for both intermediate and power range operation. In accordance with the invention, the same detector assemblies 11 are utilized to provide an indication of flux levels during the shutdown condition and in the source range. This is done without the need for an additional costly and sometimes unreliable monitoring instrument array of the necessary sensitivity.

More particularly, in the illustrated embodiment, the output channel 12 of the detector assembly 11 is summed in a pulse summer 72 and coupling means 14 to a summing means 13. The other detector outputs are similarly coupled to the summing means. To provide electrical isolation between the summing means 13 and the detector outputs 12 and between the signal outputs 12 of the four redundant and separate safety assemblies and thus prevent spurious signals from being communicated therebetween, the isolation means 15 are provided. In the embodiment of FIG. 1, the coupling means 14 include a light emitting diode 75 connected to the pulse summer 72. An optical fiber cable 15 serves as the isolation means and couples the diode 75 to the summing means 13. The summing means 13 preferably includes an array of photo diodes 77 one for each channel. The electrical pulses generated by two of the photo diodes 77 are combined in a log count rate circuit 78, and the other two by a log count rate circuit 79. By dividing the channels into groups and summing separately, two independent count rate outputs are provided. Thus, if one channel should develop an oscillation or source of noise that makes its count rate output read higher, the other independent output is not affected. The independent outputs are indicated by meters 81 and 83. To provide an output indicating the total count rate of all channels, buffer amplifiers 85 and 87 connect the separate rate outputs to a single meter 89.

Figure 2:
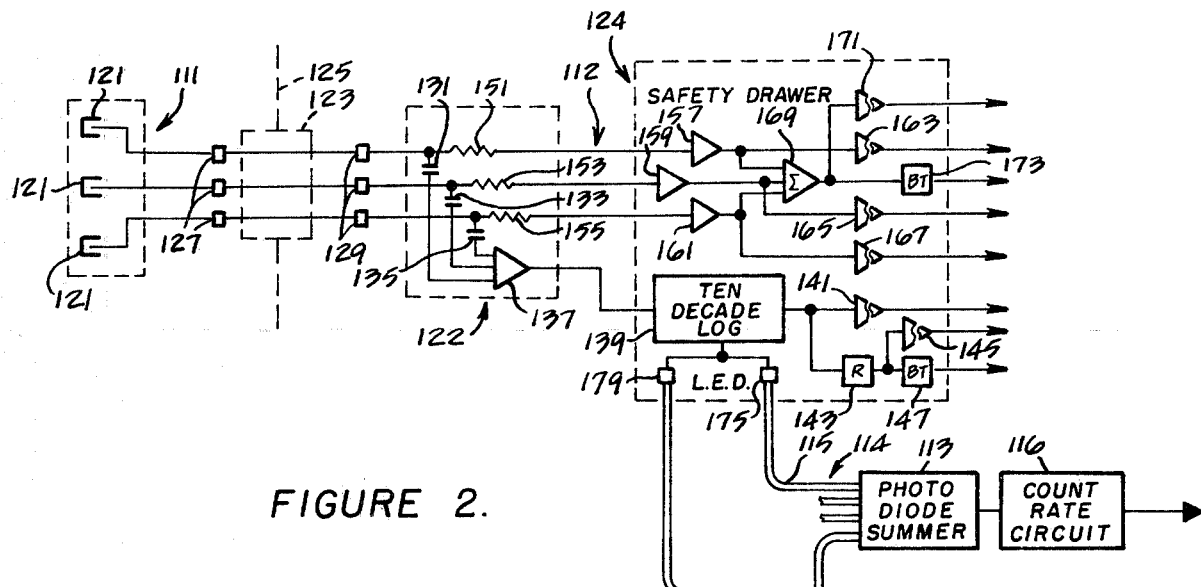
FIG. 2 is a schematic block diagram of another embodiment of the invention.

Referring now to FIG. 2, another embodiment of the invention is shown. In FIG. 2, the detector assemblies 111, two of which are shown, each contain three fission chambers 121. The output of each of the detector assemblies 111 is applied to an output channel 112. In FIG. 2, each channel comprises three output lines from the fission chambers 121, a discriminating pulse summer 122, and a safety drawer 124, described below. A separate safety drawer 124 is provided for each detector assembly 111. The outputs of the fission chambers are fed to the summer 122 through a suitable junction box (not shown) containing line and decoupling filters (not shown) for the chamber high voltage (not shown). The secondary containment is indicated schematically by the line 125, the penetration by 123, and the line connections on the interior and exterior of the pressure vessel are indicated at 127 and 129, respectively.

In FIG. 2, the discriminating pulse summer 122 comprises capacitors 131, 133 and 135 through which the a-c component of each of the signals from the outputs of the fission chambers 121 are applied to a summing amplifier 137. The output of the summing amplifier 137 is applied to a ten decade log circuit 139 (such as shown in U.S. Pat. No. 3,579,127) in the safety drawer 124. The circuit 139 is suitably constructed to provide a log output signal of flux for the upper ten decades of the flux range of the reactor. The circuit 139 provides its output signal through a buffer amplifier 141 to provide an indication of the log of the output of the sum of the three fission chambers in the detector assembly. To provide a rate output, the output of the ten decade log circuitry 139 is also applied to a rate circuit 143, the output of which is applied to an indicator, not shown, through a suitable buffer amplifier 145. In the event the rate of change of flux exceeds a preset value, a bistable trip 147 is coupled to the output of the rate circuit 143 to produce a rate trip signal.

The outputs of the fission chambers 121 from each detector assembly 111 are also applied through resistors 151, 153 and 155, in the discriminating pulse summer 122 to the safety drawer 124. These signals, which comprise the d.c. component of fission chamber signal and are proportional to flux level in the upper decades, are amplified by amplifiers 157, 159 and 161, respectively, and are applied through buffer amplifiers 163, 165 and 167, to indicate the level of the particular fission chamber, thus providing an indication of flux tilts. In addition, the outputs of the amplifiers 157, 159 and 161 are summed in a summing amplifier 169 and are applied through a buffer amplifier 171 to indicate the power sum in that particular detector assembly. The power sum signal is also applied to a bistable trip 173 which is set to produce a power level trip signal for use in the reactor safety logic system.

The foregoing described circuitry within the safety drawer provides, for each detector assembly, a suitable indication of the neutron flux for both intermediate, start-up and power range operation. In this embodiment as well as the first, the same detector assemblies 111 are utilized to also provide an indication of flux levels during the shutdown condition or source range. More particularly, in the illustrated embodiment the output channel 112 of the detector 111 is coupled by coupling means 114, from the ten decade log circuit 139 to a summing means 113. The other detector outputs are similarly coupled to the summing means.

To provide electrical isolation between the summing means 113 and the detector outputs 112 and between the signal outputs 112 of the four redundant and separate safety assemblies and thus prevent spurious signals from being communicated therebetween, the isolation means 115 are provided. In the embodiment of FIG. 2, the coupling means 114 include a light emitting diode 175 connected to the log circuit 139. An optical fiber cable 115 serves as the isolation means and couples the diode 175 to the summing means 113 which preferably comprises an array of photo detectors such as photo diodes. The outputs of all of the channels of the detector assemblies 111 are so coupled so that, as illustrated, four light inputs to the photo diode summer 113 result. The photo diode summer 113 operates in response to light pulses applied thereto to produce a pulsed electrical output signal having a pulse rate corresponding to the sum of the applied light pulses. By applying the output of the summer 113 to the count rate circuit 116, an output indicating the total count rate of all pulses produced in all of the fission chambers 121 in all four of the detector assemblies 111 results.

For the purpose of providing redundancy so that failure of one portion of the system will not result in an inability to monitor flux, an additional light emitting diode 179 is provided corresponding to the light emitting diode 175 in each of the safety drawers. The output of the light emitting diode 179, which is a series of pulses, corresponding to the electrical pulses applied thereto, is passed by means of a fiber optic cable 181 to a second photo diode 183. The photo diode 183 operates in the same manner as the photo diode 113 to provide an electrical output signal representing the sum of the light pulses applied thereto. The electric output signal of the photo diode 183 is then applied to a count rate circuit 185 and a redundant output indicative of the total neutron flux in the lowermost range or shutdown range of the reactor is provided. Redundancy and separation for the two shutdown and source range signals required can also be obtained by combining pulse signals from only two of the four detector assemblies for each separate shutdown monitoring channel. This will result in a sensitivity decrease of each channel by a factor of two.

Although light emitting diodes, fiber optic cables and photo diodes are shown as separate elements in FIG. 1, it is possible to provide a single unit which functions identically. Such devices are available commercially as optical isolators, for example from Texas Instruments under the designation 3N219 Opto-coupler.

Figure 3:
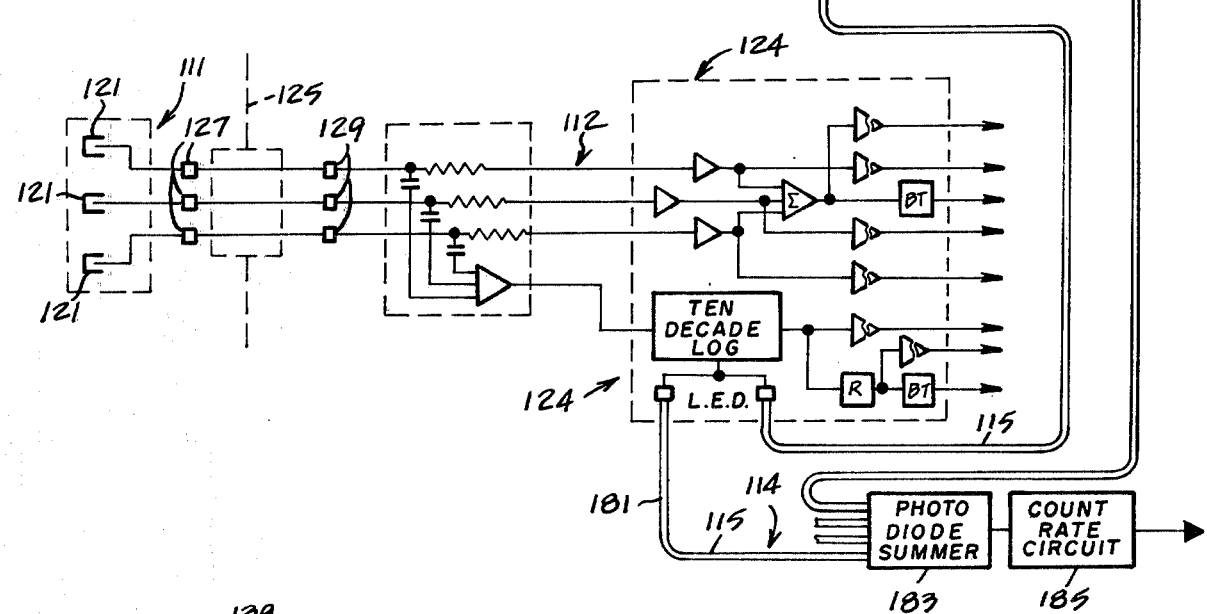
FIG. 3 is a schematic block diagram of a portion of a neutron flux monitoring system representing a still further embodiment of the invention.
Figure 3:
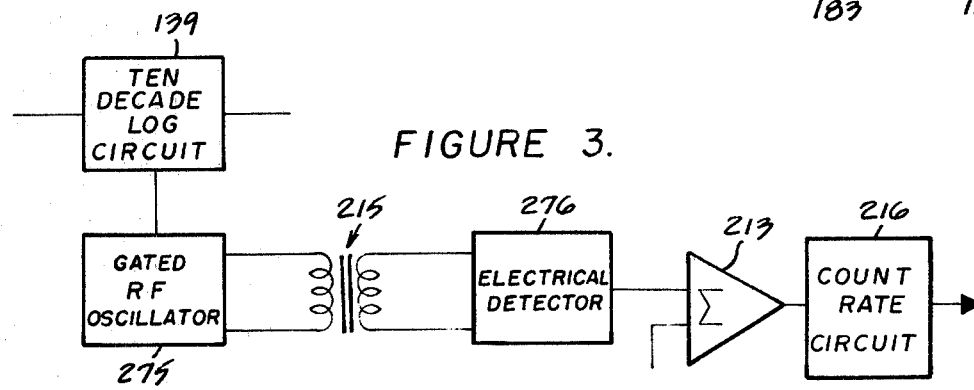

Referring now to FIG. 3, an alternative to the coupling means 114 of FIG. 2 is shown. Instead of utilizing a fiber optic cable as the isolation means, the embodiment of FIG. 3 employs a radio frequency transformer 215. A radio frequency oscillator 275 is gated on and off by summed pulses in the log circuit 139. The oscillator 275 is responsive to applied pulses to produce an output signal comprised of short bursts of radio frequency signals, each burst corresponding to one of the applied pulses. After passage through the RF transformer 215 (having adequate electrical insulation and isolation), the RF bursts are converted back into electrical pulses. To this end a detector 276 of suitable construction is employed. A summing amplifier 213, which is connected to the detectors 276 for all channels, provides a pulsed output corresponding to the sum of the input pulses. A suitable count rate circuit 216 connected thereto provides the desired output. By utilizing a second similar coupling means, a redundant output may be provided.

It may be seen therefore that the invention provides an improved flux monitoring system for a nuclear reactor which eliminates the need for proportional counters or similar sensing means for the lowermost range to be monitored. The lower decade of sensitivity for monitoring the shutdown condition is achieved directly from the same equipment required for the upper ten decades of reactor operation. The invention operates successfully with neutron flux monitoring systems which use fission chambers for the power range and intermediate range for the detectors. The system has a sensitivity to average neutron flux of many times that of a single detector (in the illustrated embodiment of FIG. 2, twelve times) and, with readily available fission chamber neutron sensitivity, can achieve the equivalent sensitivity to that of a proportional counter and adds at least an additional decade of neutron flux measurement in the source range of the reactor.

Various modifications of the invention in addition to those shown and described herein will become apparent to those skilled in the art from the foregoing description and accompanying drawings. Such modifications are intended to fall within the scope of the appended claims.

What is claimed is:

1. In a nuclear reactor system having a first subsystem for monitoring the neutron flux in the core of the nuclear reactor in the intermediate and power operation ranges of the reactor, comprising a plurality of neutron flux detector assemblies, each providing, on a respective output channel, at least one pulsed output signal at a pulse rate corresponding to detected neutron flux, and signal processing means for providing, for each channel, an indication of neutron flux in the intermediate and power operation ranges of the reactor, and having a second subsystem for monitoring the neutron flux in the core of the nuclear reactor in the source range and during the shutdown condition, the improvement wherein said second subsystem comprises summing means responsive to pulsed input signals to provide a pulsed output signal corresponding to the sum of the input pulses thereof at frequencies in the source range and the shutdown condition range, a plurality of coupling means, each connecting a respective one of the output channels to said summing means for providing pulsed signals thereto substantially corresponding to the pulsed output signals provided by the corresponding detector assembly, said coupling means each including isolation means for preventing spurious communication between said summing means and the channels and between each of the channels, and indicating means connected to the output of said summing means to represent the pulse rate of the output pulses of said summing means.

2. A system according to claim 1 wherein said isolation means each include light emitting means responsive to pulsed signals in the corresponding channel to produce a series of light pulses corresponding to the pulsed output of the detector assembly, and photo detector means for converting the light pulses back into electrical pulses, said summing means being connected to said photo detector means to produce an electrical pulsed output signal corresponding to the sum of the applied light pulses.

3. A system according to claim 2 wherein said light emitting means each comprise a light emitting diode.

4. A system according to claim 1 wherein each of said isolation means comprise radio frequency oscillator means responsive to each applied pulse to produce a radio frequency burst, a radio frequency transformer having an input connected to said oscillator means and an output, and converting means connected to said transformer output for converting the radio frequency bursts back into pulses.

5. A system according to claim 1 wherein said summing means comprises means for summing signals separately from at least two groups of said coupling means, said groups comprising a separate channel or channels totaling less than the total number of channels, and wherein said indicating means provide an indication of the pulse rate of the sum of the output signals in each group of said channels as well as in all of said channels.

6. A system according to claim 1 including further summing means responsive to pulsed input signals to provide an output signal corresponding to the sum of the pulses thereof, including a plurality of further coupling means coupling the output signals from all of the channels to said further summing means, said further coupling means each including isolation means for preventing spurious communication between said further summing means and the channels and between each of the channels, and including a further count rate circuit connected to the output of said summing means to provide an output signal representative of the pulse rate of the output pulses of said summing means, whereby a redundant monitoring channel is provided.

7. A system for monitoring the neutron flux in a nuclear reactor, comprising, a plurality of neutron flux detector assemblies, each having a respective output channel on which is provided at least one pulsed output signal at a pulse rate corresponding to detected neutron flux, a plurality of power level monitoring means each connected to the output channel of a respective one of said neutron flux detector assemblies for monitoring the neutron flux at the highest range of operation of the nuclear reactor, a plurality of intermediate range monitoring means each connected to the output channel of a respective one of said neutron flux detector assemblies for monitoring the neutron flux in the reactor at intermediate range operating levels, and shutdown and source range monitoring means for monitoring the neutron flux in the core of the nuclear reactor when the reactor is shut down or starting up, said shutdown and source range monitoring means comprising summing means responsive to pulsed input signals to provide a pulsed output signal corresponding to the sum of the input pulses at frequencies in the shutdown and source ranges, a plurality of coupling means each coupling a respective one of said output channels of said neutron flux detector assemblies to said summing means, said coupling means each including isolation means for preventing spurious communication between said summing means and said output channels, and between each of said channels, and indicating means connected to the output of said summing means to represent the pulse rate of the output pulses of said summing means.

8. A system according to claim 7 wherein each of said neutron flux detector assemblies comprises a plurality of fission chambers, and including a plurality of discriminator means each connected to a respective one of said output channels for summing the pulses from said fission chambers to provide a pulsed output signal therefrom corresponding to the sum of the pulses detected by said fission chambers.

9. A system for monitoring the neutron flux in a nuclear reactor, comprising, a plurality of neutron flux detector assemblies, each having a respective output channel on which is provided a plurality of pulsed output signals at pulse rates corresponding to detected neutron flux, a plurality of power level monitoring means each connected to the output channel of a respective one of said neutron flux detector assemblies for monitoring the neutron flux at the highest power range of operation of the nuclear reactor, a plurality of intermediate range monitoring means each connected to the output channel of a respective one of said neutron flux detector assemblies for monitoring the neutron flux in the reactor in the intermediate power range of operation of the nuclear reactor, and shutdown range monitoring means for monitoring the neutron flux in the core of the nuclear reactor when the reactor is shut down, said shutdown range monitoring means comprising a plurality of first summing means one for each of said channels for providing a pulsed output signal corresponding to the sum of the pulses in the corresponding channel at frequencies in the shutdown range, a plurality of second summing means totaling in number less than the number of said channels and responsive to pulsed input signals to provide an output signal corresponding to the pulse rate of the sum of the pulses of the input signals, a plurality of coupling means each coupling a single one of said first summing means to one of said second summing means, said coupling means each including light emitting means responsive to pulsed signals in the corresponding channel to produce a series of light pulses and photo detector means for converting the light pulses back into electrical pulses, and means for indicating the output signal of each of said second summing means and for indicating the combined output signals thereof.

* * * * *